United States Patent
LeCrone et al.

(10) Patent No.: US 8,898,444 B1
(45) Date of Patent: Nov. 25, 2014

(54) TECHNIQUES FOR PROVIDING A FIRST COMPUTER SYSTEM ACCESS TO STORAGE DEVICES INDIRECTLY THROUGH A SECOND COMPUTER SYSTEM

(75) Inventors: Douglas E. LeCrone, Hopkinton, MA (US); Paul A. Linstead, Shrewsbury, MA (US); Roger A. Ouellete, Whitinsville, MA (US); Denis J. Burt, Plymouth, MA (US)

(73) Assignee: EMC Corporation, Hopkinton, MA (US)

( * ) Notice: Subject to any disclaimer, the term of this patent is extended or adjusted under 35 U.S.C. 154(b) by 244 days.

(21) Appl. No.: 13/334,884

(22) Filed: Dec. 22, 2011

(51) Int. Cl.
*G06F 9/24* (2006.01)
*G06F 3/00* (2006.01)
*G06F 9/455* (2006.01)

(52) U.S. Cl.
USPC ............ 713/1; 713/2; 710/1; 710/11; 710/28; 718/1; 718/100; 718/102; 718/103; 718/104; 718/105; 718/106

(58) Field of Classification Search
USPC ............... 713/1, 2; 710/1, 11, 28; 718/1, 100, 718/102, 103, 104, 105, 106
See application file for complete search history.

(56) References Cited

U.S. PATENT DOCUMENTS

| | | | |
|---|---|---|---|
| 5,742,792 A | 4/1998 | Yanai et al. | |
| 6,363,462 B1 * | 3/2002 | Bergsten | 711/162 |
| 6,560,641 B1 * | 5/2003 | Powderly et al. | 709/219 |
| 6,832,186 B1 * | 12/2004 | Margulieux | 703/24 |
| 6,954,835 B1 | 10/2005 | LeCrone et al. | |
| 6,986,009 B1 | 1/2006 | LeCrone et al. | |
| 7,000,086 B2 | 2/2006 | Meiri et al. | |
| 7,054,883 B2 | 5/2006 | Meiri et al. | |
| 7,346,754 B2 * | 3/2008 | Kaneko | 711/170 |
| 7,702,762 B1 * | 4/2010 | Jagana | 709/223 |
| 7,707,186 B2 | 4/2010 | LeCrone et al. | |
| 8,099,274 B2 * | 1/2012 | Bohizic et al. | 703/23 |
| 2005/0107165 A1 * | 5/2005 | Mendelson et al. | 463/46 |
| 2005/0289218 A1 * | 12/2005 | Rothman et al. | 709/203 |
| 2006/0271348 A1 * | 11/2006 | Rossow et al. | 703/26 |
| 2007/0038996 A1 * | 2/2007 | Ben-Yehuda et al. | 718/1 |
| 2009/0043921 A1 * | 2/2009 | Roy | 710/31 |
| 2009/0164529 A1 * | 6/2009 | McCain | 707/204 |
| 2009/0254197 A1 * | 10/2009 | McLaughlin et al. | 700/2 |
| 2011/0078112 A1 * | 3/2011 | Takata et al. | 707/622 |
| 2011/0202729 A1 * | 8/2011 | Bohizic et al. | 711/141 |
| 2013/0117505 A1 * | 5/2013 | Fiske et al. | 711/114 |

OTHER PUBLICATIONS

U.S. Appl. No. 12/215,984, filed Jun. 30, 2008, "I/O Fault Injection Using Simulated Computing Environments".

* cited by examiner

*Primary Examiner* — Vincent Tran
(74) *Attorney, Agent, or Firm* — Muirhead and Saturnelli, LLC

(57) ABSTRACT

Described are techniques for providing access to storage devices. An I/O request directed to a storage device is sent over a network connection from a first computer system to a second computer system. The second computer system includes a simulated computing environment simulating aspects of the first computer system. The I/O request is received at the second computer system. The data storage system is connected to the second computer system over a first connection operating in accordance with a first protocol thereby providing the second computer system access to the storage device of the data storage system. The simulated computing environment of the second computer system may, for example, include emulation capabilities in accordance with the first protocol thereby allowing the second computer system to issue the first I/O request to the first storage device on behalf of the first computer system.

20 Claims, 5 Drawing Sheets

US 8,898,444 B1

TECHNIQUES FOR PROVIDING A FIRST COMPUTER SYSTEM ACCESS TO STORAGE DEVICES INDIRECTLY THROUGH A SECOND COMPUTER SYSTEM

CROSS-REFERENCE TO RELATED APPLICATIONS

Reference is made to U.S. Pat. No. 6,954,835, INTERCEPTING CONTROL OF A HOST I/O PROCESS, issued Oct. 11, 2005 (the '835 patent); U.S. Pat. No. 6,986,009, INTERCEPTING CONTROL OF A HOST I/O PROCESS, issued Jan. 10, 2006 (the '009 patent); U.S. Pat. No. 7,707, 186, issued Apr. 27, 2010, METHOD AND APPARATUS FOR DATA SET MIGRATION (the '186 patent); and U.S. patent application Ser. No. 12/215,984, filed Jun. 30, 2008, I/O FAULT INJECTION USING SIMULATED COMPUTING ENVIRONMENTS (the '984 application), all of which are incorporated by reference herein.

TECHNICAL FIELD

This application relates to data storage systems, more particularly, to techniques used in connection with providing access to storage devices.

BACKGROUND

Mainframe computers are large scale computer system architectures that are used by large organizations for bulk data processing, such as financial transaction processing. Mainframe computers offer enhanced availability, scalability, reliability and security along with high volume data throughput, among other features. For example, IBM Corporation's System z is a mainframe platform and computing environment that is widely used in the industry and that includes z/Architecture-based systems and zSeries mainframes. System z components may operate with IBM's z/OS (operating system) and/or other zSeries operating systems. Input/Output (I/O) devices may be coupled to interact with mainframe computers, such as IBM's System z computing environment, that may include an I/O subsystem that communicates with the I/O devices over communication channels. The I/O subsystem controls data flow between I/O devices and main storage. The I/O subsystem may be coupled to the central processors of the main system and may communicate directly with the I/O devices. I/O subsystem may communicate with the I/O devices using multiple types of interfaces, including, for example, communication channels such as Fibre channels.

Software may be designed to emulate, and/or otherwise simulate, other programs, such as operating systems. For example, it may be desirable to emulate IBM's z/OS operating system using software. It is also possible to emulate, or and/or otherwise simulate, hardware systems, such as processors, used in connection with computing systems. For example, it may be desirable to emulate components of IBM's z/Architecture computing systems. Emulation of hardware and software systems may be useful in connection with testing and other operations of I/O devices and/or other software applications and hardware components that interface with a computing environment, such as IBM's System z. One reason, in particular, for emulation is that the cost of running a System z environment may be significant. For further discussion of z/OS and z/Architecture components, see, for example, Loveland, et al., "Testing z/OS: The premier operating system for IBM's zSeries server," IBM Systems Journal, Vol. 41, No. 1, 2002, pp. 55-73, and Plambeck, et al., "Development and attributes of z/Architecture," IBM J. Res. & Dev., Vol. 46, No. 4/5, July/September 2002, pp. 367-379, which are incorporated herein by reference. See also, z/Architecture: Principles of Operation, IBM, SA22-7832-04, 2005 for a detailed z/Architecture description.

SUMMARY OF THE INVENTION

In accordance with one aspect of the invention is a system comprising: a first computer system including a first operating system and first hardware native to said first computer system; a second computer system including a simulated computing environment, the simulated computing environment including a simulated operating system that simulates at least a portion of said first operating system and including second simulation software simulating at least a portion of the first hardware; a data storage system connected to the second computer system over a first connection thereby providing the second computer system access to a first storage device of the data storage system, said first storage device to being accessible to the second computer system over the first connection operating in accordance with a first protocol native to the first computer system and not the second computer system, the second simulation software providing emulation capabilities in accordance with the first protocol native to the first computer system and not the second computer system; and a network connection between the first computer system and the second computer system, wherein the first computer system is provided access to the first storage device by issuing I/O operations to the first storage device indirectly through the second computer system whereby the second computer system receives the I/O operations from the first computer system and then issues the I/O operations to the first storage device. The simulated computing environment may include a simulated z/OS. The simulated computing environment may include a simulated System z hardware platform. The simulated computing environment may include a simulated I/O subsystem. The simulated computing environment may include a channel emulator. The channel emulator may act as an I/O subsystem providing FICON communication capability to the first storage device over the first connection. The first computer system may further comprise first code stored on a computer readable medium for: intercepting an I/O operation having a first format directed to the first storage device; encapsulating the I/O operation in a message in accordance with a network protocol; and communicating the message over the network connection from the first computer system to the second computer system. The second computer system may further comprise second code stored on a computer readable medium for; receiving the message; transforming data of the message to the I/O operation having the first format; and issuing the I/O operation to the first storage device over the first connection using the channel emulator. The first storage device may have data stored in accordance with count key data format whereby data records of the first storage device vary in length. The first connection may have a source port operating in accordance with a fiber channel protocol for accessing storage devices in accordance with a fixed block architecture. The I/O operation to the first storage device may be performed by executing a channel word program.

In accordance with another aspect of the invention is a method for providing access to storage devices comprising: sending, over a network connection from a first computer system to a second computer system, a first I/O request directed to a first storage device of a data storage system, the first computer system including a first operating system and first hardware native to said first computer system, the second computer system including a simulated computing environment, the simulated computing environment including a simulated operating system that simulates at least a portion of said first operating system and including second simulation software simulating at least a portion of the first hardware; and receiving the first I/O request at the second computer system, wherein the data storage system is connected to the second computer system over a first connection thereby providing the second computer system access to the first storage device of the data storage system, said first storage device being accessible to the second computer system over the first connection operating in accordance with a first protocol, wherein the second simulation software provides emulation capabilities in accordance with the first protocol thereby allowing the second computer system to issue the first I/O request to the first storage device on behalf of the first computer system. The simulated computing environment may include a simulated z/OS. The simulated computing environment may include a simulated System z hardware platform and a simulated I/O subsystem. The simulated computing environment may include a channel emulator acting as an I/O subsystem providing FICON communication capability to the first storage device over the first connection. The method may include: intercepting, on the first computer system, the first I/O request having a first format directed to the first storage device; encapsulating the first I/O request in a message in accordance with a network protocol; communicating the message over the network connection from the first computer system to the second computer system; receiving the message at the second computer system; transforming data of the message at the second computer system to the first I/O request having the first format; and issuing, on the second computer system, the first I/O request to the first storage device over the first connection using the channel emulator. The first storage device may have data stored in accordance with count key data format whereby data records of the first storage device vary in length, the first connection has a source port operating in accordance with a fiber channel protocol for accessing storage devices in accordance with a fixed block architecture, and the first I/O request directed to the first storage device is performed by executing a channel word program. The first storage device on the second computer system may be a mirror of a primary device on the first computer system whereby write operations to the primary device are automatically mirrored to the first storage device. The first storage device on the second computer system may be a target device of a data migration whereby a source device on the first computer system is having its data migrated to the target device and the first I/O request is one of a plurality of write operations to copy data from the source device to the target device.

In accordance with another aspect of the invention is a computer readable medium comprising code stored thereon for providing access to storage devices, the computer readable medium comprising code for: sending, over a network connection from a first computer system to a second computer system, a first I/O request directed to a first storage device of a data storage system, the first computer system including a first operating system and first hardware native to said first computer system, the second computer system including a simulated computing environment, the simulated computing environment including a simulated operating system that simulates at least a portion of said first operating system; and receiving the first I/O request at the second computer system, wherein the data storage system is connected to the second computer system over a first connection thereby providing the second computer system access to the first storage device of the data storage system, said first storage device being accessible to the second computer system over the first connection operating in accordance with a first protocol, wherein the first computer system is unable to directly access the first storage device and is provided access to the first storage device indirectly through the second computer system.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
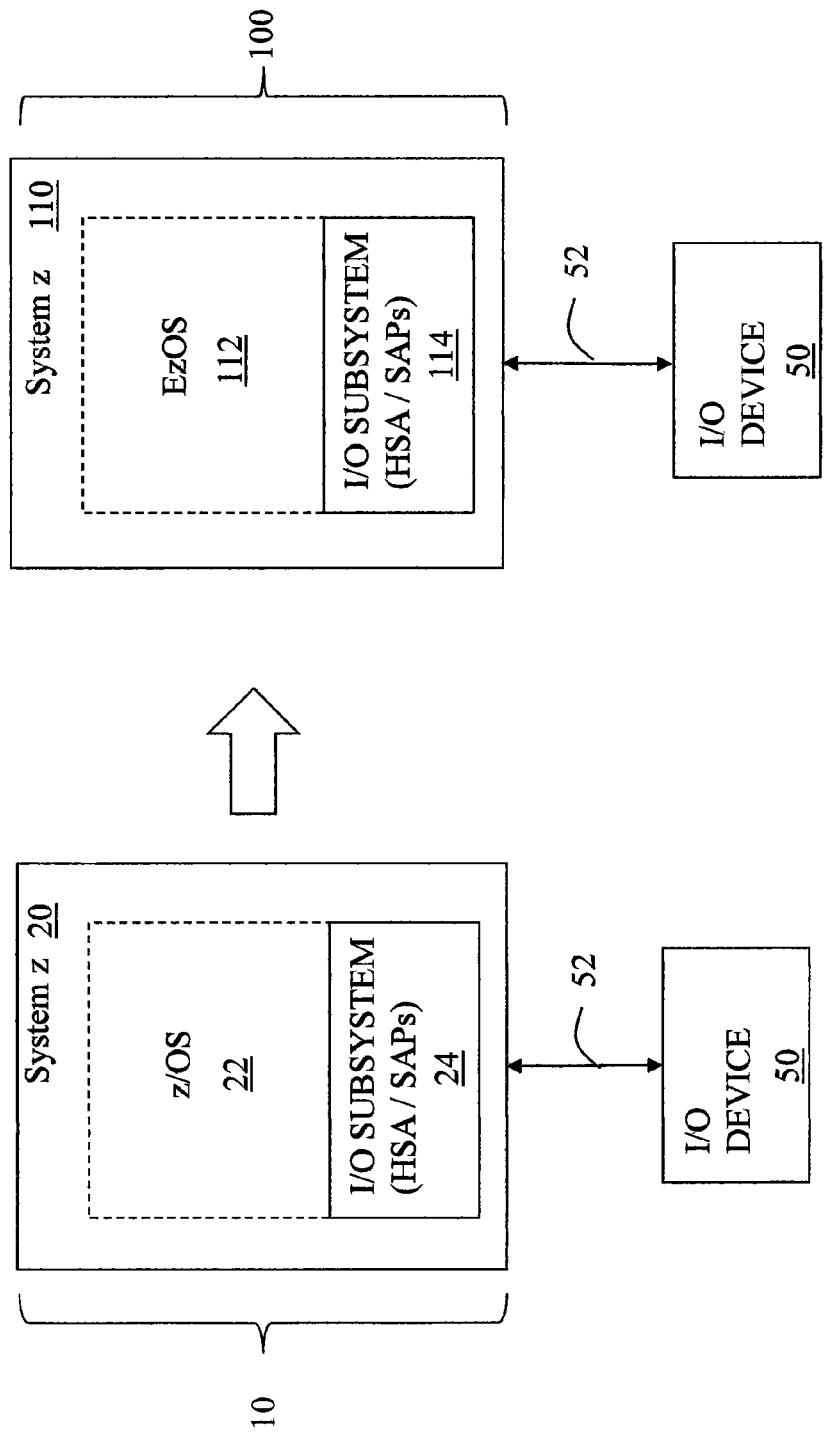
FIG. 1 is a schematic illustration showing use of a simulated z/OS (EzOS) on System z hardware system according to an embodiment of the system described herein.

Referring now to the figures of the drawing, the figures comprise a part of this specification and illustrate exemplary embodiments of the described system. It is to be understood that in some instances various aspects of the system may be shown schematically or may be shown exaggerated or altered to facilitate an understanding of the system.

In an embodiment of the system described herein, a simulated z/OS may be provided to emulate and/or otherwise simulate IBM's z/OS by having a z/OS-like interface and hardware structures. Further, in other embodiments, System z hardware components, such as z/Architecture processors, may be emulated and/or otherwise simulated and used in connection with the simulated z/OS and including emulation of I/O channels, as further discussed elsewhere herein. The use of a simulated z/OS and/or simulated System z hardware may provide reduced costs. A simulated z/OS system may be referred to herein as "EzOS". The system described herein may be used to provide access to a device connected to a first computer system whereby the first computer system includes a simulated computing environment such as, for example, using a simulated operating system, such as EzOS, and/or other simulated hardware or software components, as further discussed elsewhere herein. The device is made accessible to other computer systems indirectly through the first computer system over a network connection where the other computer systems may not otherwise be able to send I/O operations to the device.

FIG. 1 is a schematic illustration showing a system 100 in which a simulated z/OS (EzOS) 112 runs on System z hardware I/O according to an embodiment of the system described herein. As shown in FIG. 1, a known system 10 including System z hardware 20 running z/OS 22 coupled to an I/O device 50 is illustrated in comparison to a system 100 including System z hardware I/O running a simulated operating system, such as the EzOS 112 according to an embodiment of the system described herein. The I/O device 50 may include physical storage volumes and/or logical volumes. An example of the I/O device 50 may be EMC Corporation's Symmetrix data storage facility. According to the system described herein, I/O operations of the I/O device 50 may be substantially unaffected when using the system 100 as compared with the known system 10. The I/O device 50 may communicate with the system 10 or the system 100 using a channel 52. In an embodiment, to the channel 52 is a FICON channel, as further discussed elsewhere herein, but the system described herein may also operate with other suitable connectivity channels using different protocols. It should be noted that, although not illustrated, other devices and controllers may be disposed between the I/O device 50 and the system 10 or the system 100 and, for example, may include either units operating in connection with System z hardware and/or non-System z hardware, as further discussed elsewhere herein.

In the known system 10, System z hardware 20 may include an I/O subsystem 24 that is coupled to the I/O device 50 operates. The I/O subsystem 24 may include a Hardware System Area (HSA) that uses System Assist Processors (SAPs). Similarly, the system 100 according to an embodiment of the system described herein may be used in connection with System z hardware I/O. The system described herein provides for use of a simulated z/OS (EzOS) 112 on System z hardware I/O and thereby may reduce the need for z/OS software, The system 100 may include an I/O subsystem 114 similar to the I/O subsystem 24 discussed in connection with the known system 10, but which interfaces and otherwise interacts with the EzOS 112, as further discussed elsewhere herein.

According to the system described herein, EzOS provides an I/O computing environment that can establish and maintain high level of I/O activity with as little additional processor utilization as possible. As a simulated z/OS, EzOS may operate with System z hardware and simulate System z instructions and structures, as further discussed elsewhere herein. For example, for I/O processing on a System z hardware device, the system described herein may provide for modification of a Subchannel-Information Block (SCHIB) of the I/O subsystem using the ModifySubChannel (MSCH) instruction. Other I/O System z processing instructions may be simulated and manipulated using EzOS, as further discussed elsewhere herein.

System z I/O instructions that may be performed using EzOS may include, for example: channel subsystem call (CHSC); clear subchannel (CSCH); halt subchannel (HSCH); reset channel path (RCHP); resume subchannel (RSCH); set address limit (SAL); set channel monitor (SCHM); start subchannel (SSCH); store channel path status (STCPS); store channel report word (STCRW); store subchannel (STSCH); test pending interruption (TPI); test subchannel (TSCH); and cancel subchannel (XSCH). It should be noted that the CHSC instruction may be allowed to support the channel configuration commands according to the system described herein. I/O instructions that are not emulated by EzOS may be identified as no operation (NOP) instructions. The emulation and simulation of hardware I/O structures according to the described system are further discussed elsewhere herein. Simulated z/OS macros may also be supported using EzOS. For example, macro functionality may be provided to simulate: GETMAIN, FREEMAIN, WAIT, STAR-TIO, TRACE, STIMER, LOAD, CALL, DYNALLOC, ESTAE, READ, WRITE, ATTACH, as further discussed elsewhere herein.

In System z, the SCHIB is created in the HSA at initial microcode load (IML) time from the input output configuration data set (IOCDS) and may be modified using the MSCH instruction. According to the system described herein, a simulated SCHIB may be structured just as in System z (and/or other desired systems) and modified using similar System z instructions. An I/O definition file similar in format to the IOCDS may be used to define the I/O configuration and the manipulation and ownership of the SCHIB fields may be the same as with System z. Further, in an embodiment of the system described herein using non-System z hardware, emulated hardware systems, for example channel emulators, may provide for emulation of the I/O subsystem (HSA), as further described elsewhere herein.

The system described herein may support at least one initial program load (IPL) processor and may include multiple processor support. During the IPL process of the simulated z/OS described herein, an IPL module (e.g., EZOIPL00) is loaded at initial program loading from the IPL sequence. An IPL device (for example, at a location CYLINDER 0 HEAD 0) may contain records that may be read by the IPL processor. A first record may be a program status word (PSW), containing information about the program state used by the operating system, and a channel program that reads in the second record. The second record may be a channel program that reads in the IPL module (EZOIPL00). The IPL module may be loaded at real storage location zero and may contain a first section of a memory map, as further discussed elsewhere herein.

Figure 2:
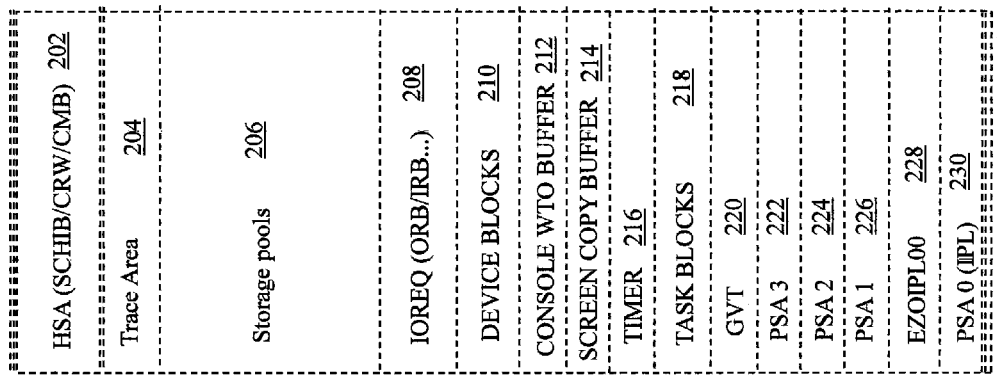
FIG. 2 is a schematic illustration of a memory map showing how addresses have been allocated for memory and any other devices for the simulated z/OS (EzOS) according to an embodiment of the system described herein.

FIG. 2 is a schematic illustration of a memory map 200 showing how addresses may be allocated for memory and other devices for the EzOS according to an embodiment of the system described herein. In an embodiment, the memory map 200 may correspond to approximately one gigabyte of memory. A section 202 of the memory map 200 may identify the HSA, and/or other I/O subsystem area, and may contain the SCHIB structure and channel report word (CRW) and channel measurement block (CMB) structures, as further discussed to elsewhere herein. A section 204 may identify a trace area for general trace facility (GTF) type trace records such that GTF-type formatting utilities may process data. A section 206 may identify storage pools containing general storage and structure to support I/O requests. Storage areas for channel command word (CCW), indirect data address word (IDAW) and modified IDAW (M IDAW) structures may be contained in the section 206. In various embodiments, the section 206 may include multiple pools of varying storage amounts, including storage pools from 4 k to 256 k.

A section 208 may identify an input output request (IOREQ) structure that represents an I/O request and contains the structures necessary to support an I/O operation, Multiple IOREQ structures may be included. The hardware structures operation request block (ORB) and interruption request block (IRB) may be contained in the IOREQ structure along with other relevant information to support I/O operations. A device block (DEVICE) section 210 represents an I/O device to the operating system and may be a direct access storage (DASD) device. There may be a 1-to-1 correspondence of each SCHIB to each DEVICE.

A section 212 may identify a console Write to Operator (WTO) buffer and a section 214 may identify a screen copy buffer. A section 216 may identify a timer. A section 218 may identify one or more task blocks (TASKS) that maintain information of tasks in the system, as further discussed elsewhere herein. A section 220 identifies the Global Vector Table (GVT) which is an anchor structure and contains pointers to other areas and may, as well, contain other system level substructures, such as a lock table that may control access to serial reusable resources.

Note that in various embodiments, other control structures may be used in connection with the system described herein and incorporated into the memory map 200. For example, a subsystem control block (SSCB) may represent the different SSIDs for physical controllers corresponding to the I/O devices. There may be one SSCB for each SSID defined to a controller. The SSCB is a list structure and the head may be pointed to by the PhyCntl. A physical control unit table (PhyCntl) may be a structure representing a physical controller. The PhyCntl may be the anchor structure for the I/O device behind the controller. Each physical controller may have a unique serial number. Multiple PhyCntls may be used for multiple controllers. For example, in an embodiment, for a Symmetrix device with a split control unit, multiple PhyCntls may be used. PhyCntl may be a list structure and the head may be pointed to by the GVT.

A plurality of sections 222, 224, 226 may identify prefix storage areas (PSAs) 3, 2, 1. PSAs provides the hardware fixed storage locations for the physical processors. Each physical processor may be assigned to a logical partition (LPAR) of the system and may have its prefix register set to a defined area to avoid overlap. The fixed areas may be primarily used during interrupts. A section 228 may identify an initial program load (IPL) module such as EZOIPL00, as further discussed elsewhere herein. A section 230 may identify a PSA 0 which is the IPL central processor hardware fixed storage area. The module EZOIPL00 may be read in at IPL time.

In an embodiment, an IPL module, such as EZOIPL00, may perform the following functions in connection with initial program loading operations. A PSA may be set up for an IPL processor. The IPL processor may have a prefix register of zero. In the case of multiple processors, before the other processors are brought online, a signal processor instruction may be issued to set the prefix register value of the IPL processor. Interrupt handlers may also be set up. A supervisor call (SVC) may be set up for requesting operating system service functionality, such as a call for dynamic allocation. The GVT may be set up, which contains the pointers to the other areas and contain other system level substructures. Further, resource initialization modules (RIMS) may be called, including storage manager and I/O initialization modules. Console device communication may be enabled, the console device permitting an operator to communicate with the system. Processing control may then be passed to the dispatcher, as further discussed elsewhere herein.

On entry to the interrupt handlers (specified addresses for which may be set by hardware contained in the PSA), the registers may be saved in a task block (TASK), if one is active. The TASK may contain a save area for registers/PSW when going into a wait state and during an interrupt The TASK is an element of the dispatch queue and can be marked non-preemptable so that, after an interrupt, control may be returned to the TASK instead of returning to the dispatcher.

A queue element of the dispatcher may be the TASK which may be located in the GVT, for example at GVTHTCB, and the active TASK addresses, if an active TASK exists, may be contained in GVTATCB. The dispatcher queue may always include at least two TASKs—one for the console device and one for the timer task. For any interrupt, if there is an active TASK, then the current task state is saved in the TASK. The interrupt handler then performs the appropriate processing and then, on exit from the interrupt handler, control may return to the dispatcher or, if the TASK is non-preemptable, then control may be returned to the interrupted TASK. A @WAIT macro may save the current state in the TASK and then branch to the dispatcher. If there is no pending work to be done then an enabled wait state is entered. In most cases, when in a wait state, an interrupt from an I/O will occur and an IOREQ will be marked complete and moved to the complete IOREQ queue. The corresponding TASK for this IOREQ may be marked as needing service. The I/O interrupt may come from a test program but may also come from the console device. Another method of coming out of the enabled wait state is the timer interrupt in which the timer TASK will be marked as needing service. A @STIMER macro may be supported such that when a @STIMER is issued, a timer queue element (#TQE) is built and chained off the GVTHTQE which will point to the TASK or exit to be driven when the time interval expires. If the timer queue element points to a TASK then timer queue element will be marked service pending and dispatachable. If the timer queue element is an exit, the exit will be driven out of the external interrupt first level interrupt handler (FLIH).

An I/O supervisor may handle I/O initialization along with the construction of the I/O structures. In addition, the @STARTIO interface may be included which includes queuing the IOREQ to the DEVICE and starting the request if the DEVICE is not active. Functionality may include parallel access volume (PAV), Dynamic PAV (DPAV) and Hyper PAV (HPAV) processing. The I/O supervisor may have a TASK on the dispatch queue at all times for I/O MIH process and/or other I/O tasks. After being set up for a request, an IOREQ passes to an IOREQ manager which will start the I/O request if a DEVICE is not active. If the DEVICE is active, the IOREQ may be queued on the DEVICE for execution. Once the IOREQ is started, it may also be queued on the active IOREQ list. When the request is complete, the IOREQ may then be moved to the IOREQ complete list by the I/O interrupt handler. The program IOPLAY may be supported to run on the system and, in an embodiment, a different I/O profile may be supported on each DEVICE with all defined DASD devices running in parallel. The system described herein may support I/O operations for multiple devices, such as 64 k devices.

Access methods for writing to a direct access storage device (DASD) may be supported according to the system described herein. For example, the system described herein may support sequential and partitioned data set (PDS) files. In an embodiment, the access method may parallel the Multiple Virtual Storage (MVS) operating system such that files may be shared across MVS and EzOS, and, for example, the MVS GTF-type trace formatting program may be used to process data. Storage management may be based off the system planning tool (SPT) storage pool manager. The macros @GETMAIN/@FREEMAIN may be used and provided to support the parameters needed for test suite programs, such as the STCMON test suite provided by EMC Corporation of Hopkinton, Mass. A parameter may specify the storage key that may be used. Further, the @ESTAE macro may be supported to create a recovery environment. An area in the TASK may define the system diagnostic work area (#SDWA). An eight depth recovery stack may be used that allows to percolation. The machine check FLIH may use the area in the TASK for recovery.

In an embodiment, the system described herein may operate with a dynamic address translation (DAT) system off and use storage keys to provide operating system/application segmentation. Alternatively, the DAT system may be turned on to provide a 1-to 1 correspondence from a real to a virtual page. System z DAT technology is used by z/OS, and other zSeries operating systems, to enable the activation and concurrent use of multiple 64-bit virtual memory spaces by multiple processes running under each OS instance.

Figure 3:
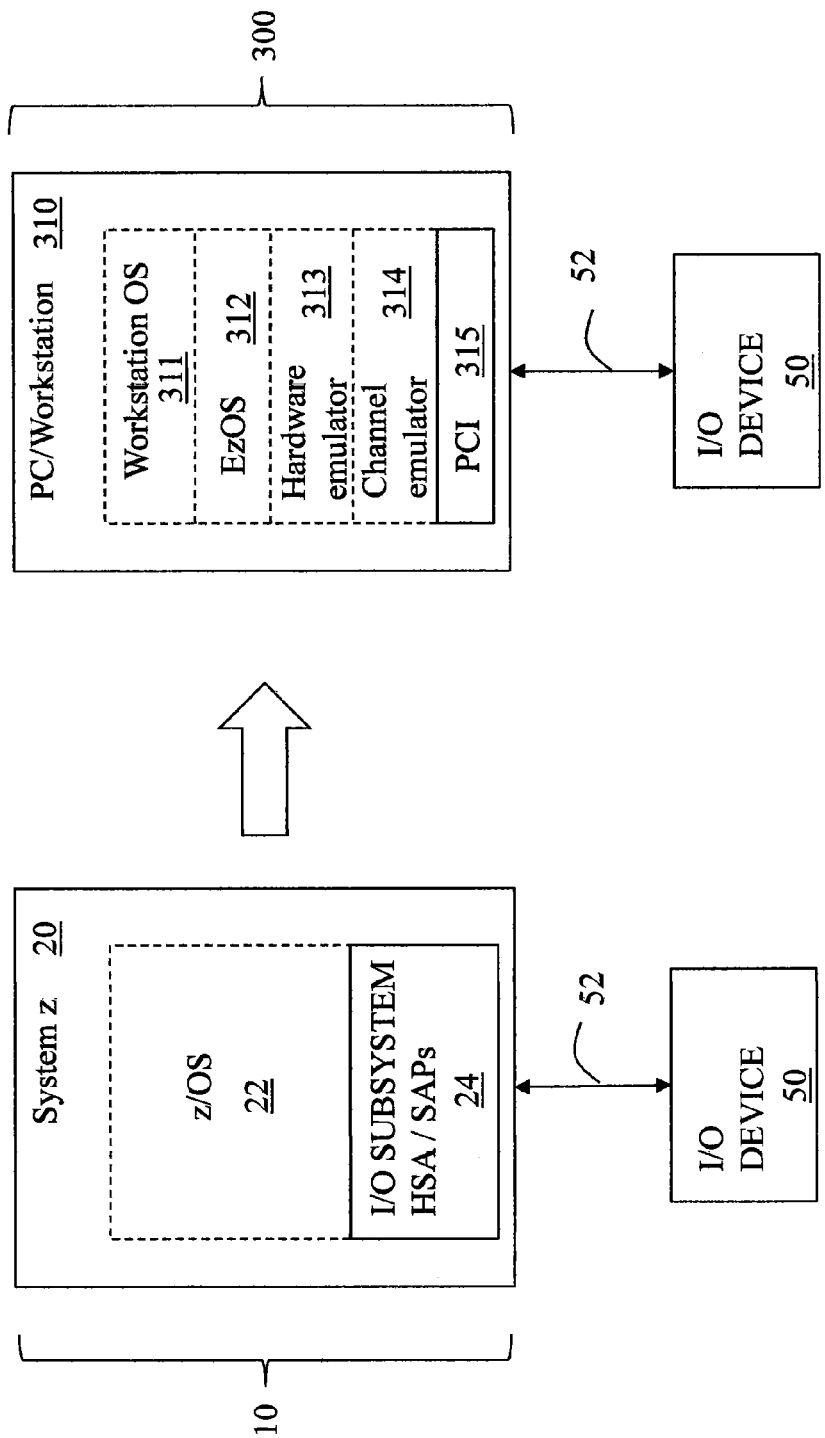
FIG. 3 is a schematic illustration showing use of the simulated z/OS (EzOS) on non-System z hardware, such as a PC/Workstation according to an embodiment of the system described herein.

FIG. 3 is a schematic illustration of a system 300 showing use of a simulated z/OS system (EzOS) 312, similar to the EzOS 212 discussed elsewhere herein, on a non-System z hardware system 310, such as a PC/Workstation running Linux or other non-System z operating system 311, according to an embodiment of the system described herein. In FIG. 3, the system 300 is shown in comparison to the known system 10, as further discussed elsewhere herein. The PC/Workstation 310 may have EzOS 312 loaded thereon and may further include a hardware emulator 313 (such as the Hercules Emulator, an open source software program that allows emulation of the System z instruction set, as further discussed elsewhere herein) and a channel emulator 315, as further discussed elsewhere herein. A Peripheral Component Interconnect (PCI) 315 may provide an interconnection for I/O operations with the I/O device 50, such as the Symmetric data storage facility from EMC Corporation. The system 300 provides for simulation of a System z I/O subsystem using non-System z hardware. Using the system described herein, the I/O processing on the non-System z hardware may operate with FICON and/or with other appropriate channel protocols. For example, the FICON channel may operate in accordance with a standard protocol such as FICON specification FC-SB-3 or FC-SB-4. According to the system described herein, I/O operations of the I/O device 50 may be substantially unaffected when using the system 300 as compared with the known system 10.

A known emulator of z/Architecture hardware systems, and other computer systems, is the Hercules Emulator, an open source software program created by Roger Bowler and released under the Q Public license. The Hercules Emulator is an open source software implementation of mainframe System/370, ESA/390 and z/Architecture hardware. For example, using Hercules, a PC workstation can emulate a mainframe processor. Hercules implements raw S/370, ESA/390 and z/Architecture instruction sets but does not provide operating system facilities. For further discussion of the Hercules Emulator, see, for example, *Hercules—General Information*, Version 3, Release 05, Modification 0, Publication No. HEGI030500-00, Sep. 1, 2007, which is incorporated herein by reference. In various embodiments, the system described herein may used in connection with computer architecture emulators, such as Hercules, as further discussed elsewhere herein.

In an embodiment, the system described herein provides for a channel emulator to emulate data transfer paths in I/O operations. The channel emulator may simulate a host channel to provide I/O connectivity with an I/O device and may provide for the I/O connectivity using different channel protocols. For example, IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith. For example, Symmetrix, provided by EMC Corporation of Hopkinton, Mass., is a disk storage facility that may be compatible with FICON. For further discussion of FICON in connection with IBM System/390, a precursor to IBM System z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference, The channel emulator according to the system described herein may simulate System z I/O structures. For example, the channel emulator may simulate the structure of the SCHIB as in System z such that manipulation/ownership of the SCHIB fields may be the same but with the channel emulator, and/or other emulated components, acting as the I/O subsystem. The channel emulator may be referred to herein as "CHEM". In an embodiment, the system described herein may provide for FICON I/O, and/or I/O operations using other appropriate channel protocols, with a non-System z computing platform, as further discussed elsewhere herein.

Multiple-channel subsystem (MCSS) functions may be provided to the operating systems executing in each of the system's logical partitions (LPARs). In an embodiment, the system described herein may provide for 128+LPAR simulation. For further discussion of channel-subsystem hardware and software in zSeries systems, including multiple-channel subsystem I/O configurations, see Wyman, et al., "Multiple-logical channel subsystems: Increasing zSeries I/O scalability and connectivity," IBM J. Res. & Dev., Vol. 48, No. 3/4, May/July 2004, pp. 489-505, which is incorporated herein reference.

A storage device, such as the device 50 described above, may be included in a data storage system such as a data storage array by EMC Corporation. As noted elsewhere herein, the storage device may be a physical device (e.g., disk drive, flash-based or solid state storage device, tape device, and the like) or a logical device mapped onto one or more physical devices or portions of one or more physical devices. The data storage system may support multiple different attachment methodologies or techniques in accordance with a variety of different standards and communications protocols that may be used by the different client computer systems in connection with accessing the storage device of the data storage system. Depending on the particular computer system and computing environment, the storage device may be accessed using a suitable attachment or connection methodology in accordance with a standard. For example, the system 10 described above may be an IBM z series mainframe computing system which uses a FICON connection to access data of the device stored in accordance with a first disk data architecture known as count key data (CKD). Thus, FICON and the CKD data format or architecture may be characterized as native to the system 10 (e.g., native with respect to the System z hardware and z/OS), Additionally, the System z hardware and z/OS may also be characterized as native with respect to the system 10 as described above.

CKD is a disk data architecture where each physical disk record consists of a count field, an optional key field, and a ("user") data field with error correction/detection to information appended to each field. The sizes of the records within a single device may vary with the CKD architecture. Since data record lengths can vary, they all have an associated count field which indicates the size of the key if used and the size of the data. The count field has the identification of the physical location in cylinder-head-record format, the length of the key, and the length of the data. The key may be omitted or consist of a string of characters. Most often the key is omitted, the record located sequentially or by direct cylinder-head-record addressing. If it is present, the key is typically a copy of the first n bytes of the data record but can be any data which will be used to find the record. The key (and hence the record) is locatable via hardware commands.

As known in the art and mentioned elsewhere herein, I/O requests directed to devices in accordance with the CKD format may be in the form of channel programs (also known as channel word programs or chains) including an ordered sequence of channel command words (CCWs). Additionally, channel word programs, processing I/O requests, and the like, in connection with the system 10 are described also, for example, in the '835 patent, '009 patent, and '186 patent, all of which are incorporated by reference herein.

In contrast to the CKD architecture is a fixed block architecture (FBA). FBA is another disk data architecture where the data of the storage device is mapped over fixed size blocks or sectors. With an FB architecture, the location of any block can be calculated to retrieve that block. This architecture uses tracks and cylinders. A physical disk contains multiple blocks per track, and a cylinder is the group of tracks that exists under the disk heads at one point in time without performing a seek operation. Thus, a device with FBA has a data layout in which each addressable record, such as a block, on disk is of the same size such as providing for logical block addressing (LBA). The FBA architecture may be used with different connectivity or attachment methodologies and standards than those used in connection with the CKD architecture. For example, the FBA may be an architecture supported and utilized by the data storage system when accessing devices over a SCSI/FC connection rather than a FICON connection. The SCSI/FC connection and FBA architecture may be used, for example, with a computer system such as represented by 310 of FIG. 3 running a UNIX or LINUX-based operating system (e.g., operating system other than the z/OS or MVS operating system) and which may further include a different underlying hardware architecture than System z. For example, a computer system such as represented by 310 of FIG. 3 may include hardware based on an Intel-based architecture such as an x86 architecture. (The term x86 may refer to a family of instruction set architectures based on the Intel 8086 CPU). Thus, the FBA architecture and connection methodologies (protocol or standard such as over a SCSI/FC connection) used to access storage devices in accordance with the FBA architecture may be characterized as native with respect to systems (e.g., such as system 310 of FIG. 3) other than that as described above in connection with the system 10. In other words, in one aspect, the FBA architecture and connection methodologies (protocol or standard such as over a SCSI/FC connection) used to access storage devices in accordance with the FBA architecture may be characterized as native with respect to a computer system such as 310 having a different computing environment (e.g., hardware and/or software) than the system 10. For example, the FBA architecture and connection methodologies (protocol or standard such as over a SCSI/FC connection) used to access storage devices in accordance with the FBA architecture may be characterized as native with respect to a computer system 310 running, for example, the LINUX or UNIX-based operating system and/or having the x86 architecture. In contrast, the CKD architecture and FICON connection (and associated standards or protocols) may be characterized as non-native with respect to such a system 310 and computing environment (e.g, the CKD architecture and FICON standard/connection may be non-native with respect to a computer system running, for example, the LINUX or UNIX-based operating system and/or having the x86 architecture). Furthermore, in a similar manner, the FBA and SCSI/FC connection (and associated standards or protocols) may be characterized as non-native with respect to the system 10 and its computing environment (e.g., the FBA and SCSI/FC connection (and associated standards or protocols) may be characterized as non-native with respect to a computer system running, for example, an IBM-based operating system such as the z/OS or MVS and/or having the System z hardware architecture including the hardware-based I/O subsystem).

What will now be described are techniques that may be used in connection with making one or more storage devices accessible such as over a network.

Figure 4:
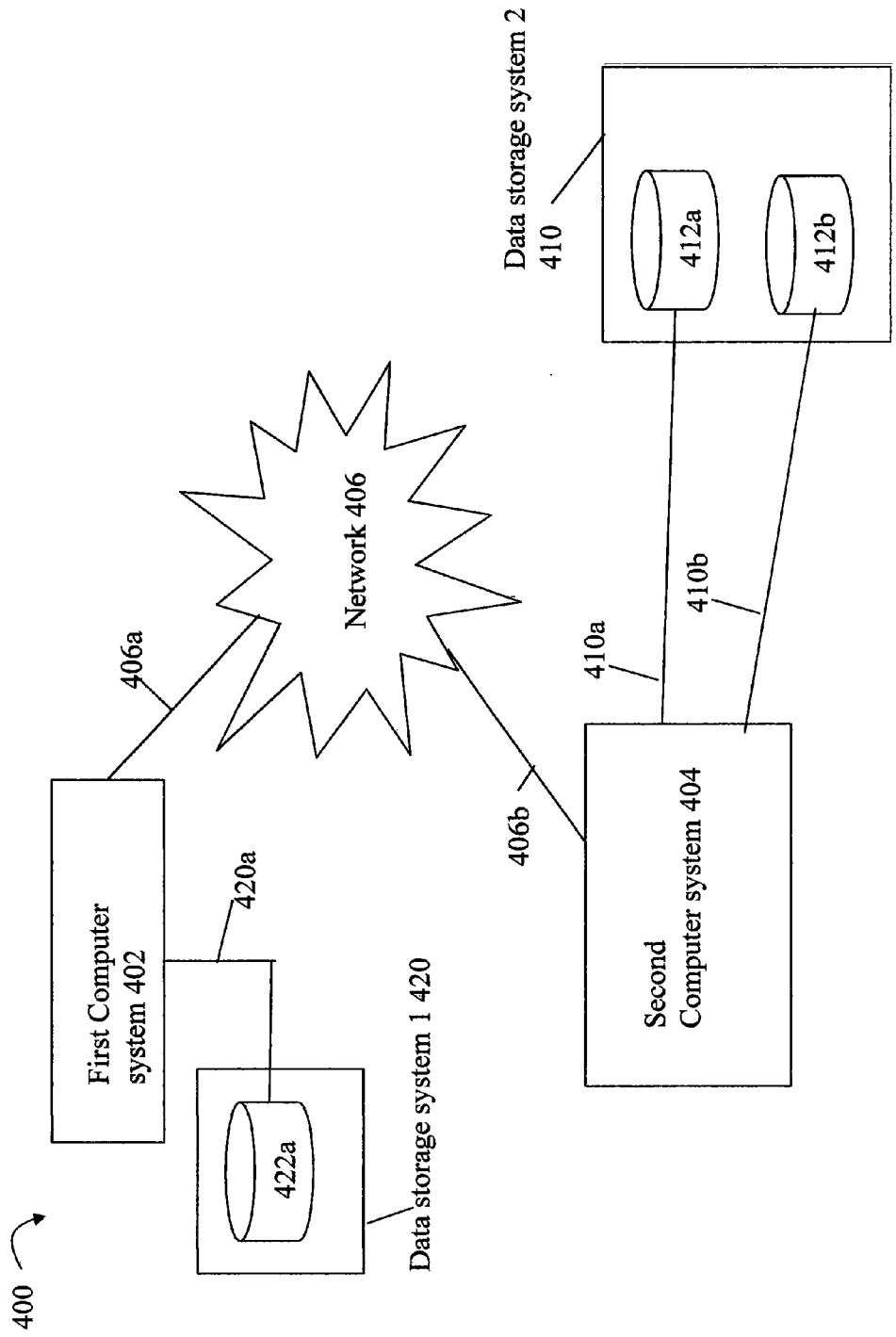
FIG. 4 is an example illustrating a network and systems that may be included in an embodiment in accordance with techniques herein.

Referring to FIG. 4, shown is an example of a system and network in an embodiment in accordance with techniques described herein. The example 400 includes computer systems 402, 404 connected to network 406. The network 406 may be, for example, the internet and the systems 402, 404 may communicate with each other and other systems and components (not illustrated) using suitable network communication protocols such as TCP/IP. The first computer system 402 may be, for example, the system 10 described above connected via connection 406a to network 406. The first computer system 402 may access device 422a of storage system 1 420 over connection 420a. The device 422a may have a data layout based on the CKD architecture and format and the system 402 may access data of device 422a using a FICON connection.

The second computer system 404 may be, for example, the system 310 of FIG. 3. The second computer system 404 may access devices 412a, 412b of the data storage system 2 410. The device 412a may have a data layout based on the CKD architecture and format and the system 404 may access data of device 412a using a FICON connection through functionality provided in the simulated computing environment of the system 404. Thus, the simulated computing environment of the system 404 may provide for accessing non-native devices, such as device 412a, which are non-native with respect to the system 404 but where such device may be native with respect to the system 402. The second computer system 404 may also access native devices, such as device 412b, where device 412b has a data layout in accordance with the FBA and which is accessed using a SCSI/FC connection 410b. Thus, the data storage system 2 410 may provide support for devices in accordance with the FBA and CKD architectures and associated protocols (e.g., FICON to access CKD device and SCSI/FC to access FBA device). It should be noted that in accessing data of the devices 412a and 412b, the underlying hardware of a fiber channel adapter and link layer may be the same. However, the connection or access protocol at higher levels is different when performing I/O operations (e.g., accessing data on) with respect to each of the devices 412a and 412b.

The devices 412a, 412b may be directly accessible to the second computer system 404. The first computer system 402 may not have direct access to the data storage system 2 410 and its devices. In accordance with techniques described herein, storage device 412a may be made accessible to the first computer system 402 indirectly and transparently through the second computer system 404. As described below in more detail, the first computer system 402 may direct I/O operations to the device 412a which are in accordance with a format and form native to the first computer system's computing environment. Processing may be performed on the system 402 with respect to an I/O operation for device 412a where such processing may include intercepting the I/O operation, extracting instructions and any data from the I/O operation in the first form, encapsulating the instructions and data in one or more packets for transmission in a message over the network 406, and sending the transmission over the network 406 to the second computer system 404. The second computer system 404 may receive the transmission including the I/O operation directed to the device 412a and perform other processing including extracting the data and instructions of the I/O operation from the encapsulated message, placing the data and instructions in the original form of the I/O operation thereby having the first format and form native to the first computer system's computing environment, and issuing the I/O operation using the simulated computing environment of the system 404. In a similar manner, any results regarding the I/O operation such as, for example, status information, return data such as for a read operation, and the like, may be returned from the system 404 to the system 402. For example, results regarding the I/O operation may initially have a format and form native to the first computer system whereby such results may be placed or transformed into a form for transmission over the network 406. For example, the system 404 may perform processing to encapsulate the results within one or more packets transmitted over network to the system 402. Code on the system 402 may receive the transmission and perform processing to extract the results from the encapsulated message, and transform or place the results in a form and format native to the first computer system 402. The first computer system 402 may then process the transformed results for I/Os issued to device 412a in a manner similar to results received in connection with I/Os issued to device 420.

Thus, techniques described herein may be used to make device 412a available over the network (such as the internet) thereby making the device 412a and its data accessible to the first computer system 402 without requiring direct connectivity between first computer system 402 and the data storage system 2 410 including the device 412a with the CKD data. In this particular embodiment, the device 412a has a data format and layout in accordance with the CKD architecture accessible using a FICON connection and is indirectly and transparently made available for I/O operations to the first computer system 402 to which the foregoing device 412a is native. The device 412a native with respect to the first computer system 402 may be made accessible to the first computer system 402 through a network connection to a non-native second computer system 404 which does have direct access to the device 412a. Such direct access to device 412a may be provided using the simulated computing environment of the system 404. More generally, the techniques herein may provide for making the device 412a available to multiple systems such as multiple instances of the system 10.

With reference back to FIG. 3, the system 310 includes hardware emulator 313 such as Hercules described above which may provide for runtime interpretation of assembly language native to the system 404. The hardware emulator 313 may take as an input, for example, assembly language native to the system 404 and may output corresponding C code. The channel emulator 314, such as CHEM, may perform processing when I/Os are issued and provide for channel emulation of the hardware represented by element 24 of the system 10. The channel emulator 314 may provide functionality for connecting to device 412a over a FICON connection.

In connection with the system 10, the native I/O processing is asynchronous which is in contrast to that of the system 404 (e.g., based on the x86 architecture using the LINUX or UNIX-based operating system) where I/O processing is primarily synchronous. With the asynchronous I/O processing of the system 10, the hardware of the I/O subsystem 24 includes dedicated processors which are dedicated to I/O processing. With the system 10, a main or general purpose CPU may pass an I/O for processing to the hardware of the I/O subsystem and the CPU may continue with other tasks while the I/O processing is performed by the I/O subsystem. The main CPU is notified (e.g., via interrupt) upon completion of the I/O processing. In contrast, the system 404 may perform synchronous I/O processing whereby the main or general CPU processor performs I/O processing. Thus, CHEM on the system 404 includes a simulated computing environment that provides for simulation of such asynchronous I/O processing that is native with respect to the System z functioning as the first computer system 402.

In accordance with techniques herein and with reference again to FIG. 4, the first computer system 402 which is an instance of the system 10, may be configured to automatically and transparently have I/Os directed to device 412a intercepted for special processing in accordance with techniques herein. An embodiment may generally use any suitable technique to perform such intercepting or selective capturing of I/O operations issued by an application on the first computer system 402 which are directed to the device 412a. For example, an embodiment may use techniques described in the '009 patent and the '835 patent, both of which are incorporated by reference herein, to intercept such I/O requests for special processing in accordance with techniques herein.

The first computer system 402 may be configured to associate, convert or map a first device reference (such as a host logical device and/or logical address as may be used by an application executing on the system 402 issuing I/Os) to a second device reference recognized by the data storage system 410. As also known in the art, UCBs or unit control blocks, and related structures are assigned to each logical device as used on the system 402. Operating system I/O control routines may use UCBs to perform the foregoing conversion. Thus, an embodiment in accordance with techniques herein may further modify the UCB and/or other appropriate structure as may be used in a system for device 412a in order to specify that I/O requests for device 412a require special processing and have the suitable second device reference for use on the data storage system 410. UCBs and such other related structures as may be used in connection with I/O processing are known in the art and also described, for example, in the '186 patent incorporated by reference herein.

The special processing performed on the first computer system 402 for intercepted I/Os directed to device 412a may include extracting the I/O request data and instructions as to expressed in the form of a channel word program. For example, the system 402 may issue a START I/O macro which expands into multiple instructions including an SSCH instruction thereby indicating the start of the I/O operation processing. The I/O request may be intercepted prior to issuing the SSCH instruction. The captured I/O request includes a channel program with CCWs having instruction(s) and data for the I/O request as understood in accordance with the FICON protocol. The channel program is processed whereby the data and instructions of the channel program are extracted and placed in another second suitable format. The second format may include the extracted instructions and data of the I/O request in an encapsulated message format suitable for transmission over the network 406. For example, the message may be a TCP/IP message including the encapsulated I/O request data and instructions. The first computer system 402 may then transmit the message over the network 406 to the second computer system 404.

The second computer system 404 may include code for further processing the received message including the encapsulated I/O request data and instructions in the second expected format. In one embodiment, code of the simulated operating system such as the EzOS 312 of FIG. 3, may include code to further process the received message. Generally, the format of the received message may be any suitable format that is agreed upon or understood by both the systems 402 and 404. The second computer system 404 may receive the encapsulated channel program and may then unpack (e.g., expand or transform) the encapsulated channel program having the second format back into its original format (e.g., into the original channel word program having its first format as on the system 402 which is native to the system 402). The code of the EzOS 312 may then issue the I/O request by commencing processing of the channel word program whereby a start subchannel instruction is issued to other portions of the simulated computing environment.

Thus, as described above, the first computer system 402 which may be an instance of the system 10 described elsewhere herein may intercept and transform an I/O request for device 412a from a first format (e.g. channel word program for issue an I/O request to a CKD device) to a second format for a TCP/IP message for transmission across network. The receiver or target computer system 404 may then transform the second format back into the first format (e.g., channel program format) understood by FICON target port of the data storage system for device 412a.

Any results from the I/O request (e.g., status information read data, and the like), may be returned upon a return path that is the same as the sending path. When sending such information or results back to the first system 402, the processing may be characterized as the reverse of that as described above in connection with the I/O request. The EzOS 312 may perform such processing. For example, the I/O request results (e.g., such as read data or other information to be returned to the sender) may be placed by the sending second computer system 404 into an encapsulated format for transmission across the network 406 to the first computer system 402. Code on the first computer system awaiting notification upon completion of the I/O request may perform special processing to transform the encapsulated I/O request results of the received message into a native format expected for I/O request results on the first computer system 402.

It should be noted that the second computer system 404 may also be, for example, the system I/O of FIG. 1. Additionally, and more generally, the techniques herein may provide for making the device 412a available to multiple systems such as multiple instances of the system 10 as well as other computer systems whereby the first computer system 402 may also be a system other than an instance of the system 10. The other computer systems functioning as the first computer system 402 accessing the device 412a may be instances, for example, of the system 210, 310 or any other system. Such other systems accessing device 412a may be considered non-native with respect to the system 10 and with respect to the device 412a. That is, the other computer system may have a different underlying system hardware platform and/or operating system than the system 10 and may not be able to issue I/O operations to device 412a directly without making use of the simulated computing environment.

Generally, any computer system functioning as first computer system 402 accessing device 412a may include code that performs processing similar to that as described above. For example, assume the first computer system 402 is an x86-based system running a LINUX operating system. In this case, the system may include code which captures an I/O request directed to device 412a, generates a channel program for the I/O request, transforms the channel program (e.g., extracting data and instructions) into an encapsulated form for transmission across the network 406, and then sends the transmission to the system 404. The system 402 may also include code for processing any I/O operation results received from the second computer system 404 where the results are included in an encapsulated message having an expected or known format generated by the system 404 and understood by the code processing the received results. In this manner, the system 402 may map the received message into any format suitable for native use by the system 402. Thus, the sending first computer system 402 accessing device 412a may or may not have the channel program and CKD format as its native format whereby the foregoing are native with respect to the device 412a. If the sending first computer system 402 is non-native with respect to the device 412a, the system 402 may include code for generating the channel word program from another input format representing the I/O request native to the first computer system.

It should be noted that the first computer system 402 may have knowledge about, or may become aware of, device 412a and its availability through the second computer system 404 in any suitable manner. For example, the first computer system 402 may be configured to know about the device 412a and direct I/Os to device 412a over the network in manner as described above to the second computer system 404. As another example, the second computer system 404 may publish the device 412a as being accessible through itself over the network 404 so that the first computer system 402 may obtain such published information as a result of discovery processing.

In accordance with one aspect and embodiment of techniques herein, a second computer system 404 that is an instance of 310 of FIG. 3 (e.g., using an x86-based computer system platform running a LINUX operating system with a simulated computing environment), may function as a server providing access to a device 412a having data in accordance with the CKD architecture and format whereby such accessibility is facilitated to through the simulated computing environment of the system 404. Using the simulated computing environment, the system 404 may access the data of device 412a over a connection 410a where the connection 410a includes a first source port in accordance with SCSI/FC protocol and a second FICON target port of the data storage system. A sending first computer system 402 which is an instance of the system 10 may issue an I/O request (in the form of a channel word program) to device 412a which is intercepted. The channel word program for the I/O request may have its data and instructions extracted and encapsulated in a transmission sent over the network to the second computer system 404. The system 404 may then convert the received transmission back into its original channel word program form and then issue the I/O request in the form of the channel word program using the simulated computing environment. For example, the I/O request processing utilizes the channel emulator 314 to issue the I/O request to the FICON attached device 412a. The foregoing enables access to device 412a (which contains FICON/CKD data) to be provided to over a network where such access may be provided indirectly through a server computer having direct access to the device 412a and such access may be provided to requesting client computer systems which may be native or non-native with respect to device 412a.

Figure 5:
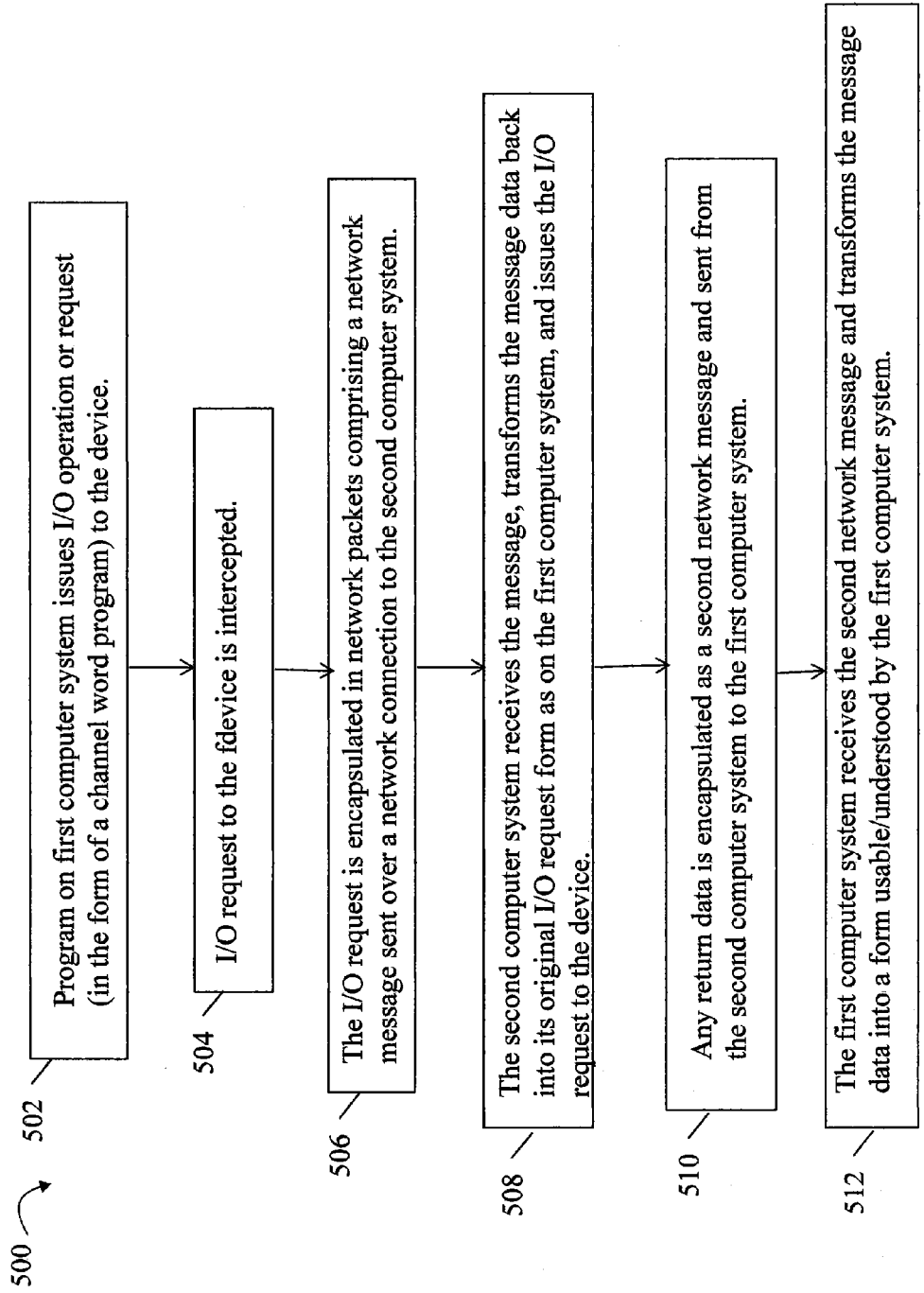
FIG. 5 is a flowchart of processing steps that may be performed in an embodiment in accordance with techniques herein.

Referring to FIG. 5, shown is a flowchart of processing steps as may be performed in an embodiment in accordance with techniques herein. The flowchart 500 summarizes processing steps described above whereby the first computer system 402 of FIG. 4 is an instance of the system 10 and the second computer system 404 is an instance of the system 310 of FIG. 3. At step 502, an application on the first computer system may issue an I/O operation or request in the form of a channel word program to the device 412a. At step 504, the I/O request to the device is intercepted on the first computer system. At step 506, the I/O request is encapsulated in network packets comprising a network message sent over a network connection to the second computer system. At step 508, the second computer system receives the message, transforms the message data back into its original I/O request form of the channel word program as on the first computer system, and then issues the I/O request to the device. At step 510 upon completion of the I/O request, any return data is encapsulated as a second network message sent from the second computer system to the first computer system over the network. At step 512, the first computer system receives the second network message and transforms the message into a form usable or understood by the first computer system.

In various embodiments, the system described herein may be used to run other MVS applications. In some cases, the applications may be reassembled. In other cases, the applications may be run with an emulator, such as a z/OS service emulator. Further, the system may be used in connection with a Geographically Dispersed Disaster Restart (GDDR) control system, an outboard data migration system, a tape backup engine, a database and sort offload processing engine, a storage management subsystem (SMS) data mover, and/or other uses.

As will be appreciated by those skilled in the art, the techniques described herein have many uses and applications. For example, the techniques herein may be used in connection with the migration techniques described in the '186 patent, which is incorporated by reference herein. In such an embodiment, data may be migrated from a source device to a target or secondary device whereby the target or secondary device may be a device such as 412*a* of FIG. 4 in accordance with techniques herein. Consider the following example with reference to FIG. 4. The source device may be 422*a* and the first computer system 402 may perform processing to migrate data from 422*a* to device 412*a* as the target or secondary device in accordance with techniques herein. In this manner, the techniques described in the '186 patent may be modified to incorporate techniques described herein to write data to the secondary or target device 412*a*. Furthermore, once the source device 422*a* and target device 412*a* are synchronized, the techniques herein may be further used to maintain the target device 412*a* as a remote mirror of the source device 422*a*. In this manner, techniques also described in the '186 patent may be modified to capture or intercept any subsequent writes to the source device 422*a* which are also mirrored to the target device 412*a* in accordance with techniques herein. Thus, the devices 422*a* and 412*a* may be maintained as mirrors and furthermore used as such in connection with performing operations typical of any mirrored devices, for example, in connection with servicing I/O operations upon failure of the primary device 420. In this case, if device 422*a* fails/becomes unavailable to service I/O operations of the system 402, the system 402 may continue to service I/Os using only the remote mirror 412*a*. An embodiment maintaining devices 422*a* and 412*a* as mirrors may have the system 402 use device 422*a* as the primary device whereby writes to the primary device may be automatically also written to secondary device 412*a*.

As described above, the target device 412*a* may be represented by a UCB whereby the device 412*a* is exposed to the user as a logical device consuming resource of the operating system of the system 402. For example, a channel may be consumed using a UCB to represent the device 412*a* on the system 402. As an alternative, an embodiment may also not represent the device 412*a* on the system 402 using a UCB. Rather, the device 412*a* may be characterized as virtually represented whereby the underlying code implementing the techniques herein to direct I/Os to the device 412*a* uses various coding structures internal to the code performing the techniques herein without otherwise utilizing operating system entities and resources of the system 402 for the device 412*a* (e.g. no channel of the system 402 is consumed to represent the device 412*a* on the system 402).

In connection with techniques herein, it should be noted that the system 402 may associate a status of complete or done with respect to an I/O operation that is written both to the first device 422*a* and its mirror device 412*a*. As a first possibility, the system 402 may indicate that a write operation directed to the first device 422*a* is done/complete once the primary write to the first device 422*a* is complete (e.g., written to cache of system 422*a*) and the secondary write to the device 412*a* is in progress/pending. In other words, the system 402 may indicate that the write operation is complete once the write to the device 422*a* is complete independent of the status of the write with respect to the device 422*a*. As a second possibility, the system 402 may indicate that a write operation directed to the first device 422*a* is done/complete once the primary write to the first device 422*a* is complete (e.g., written to cache of system 422*a*) and also when the secondary write to the device 412*a* has been completed. The secondary write to the device 412*a* may be considered complete once the second computer system 404 has received the write operation, the write data has at least been written the data to its cache (e.g., which may be subsequently written out to a physical device for systems using write-back caching), and the second computer system 404 has sent a status of successful completion regarding the write to the system 402. In other words, the system 402 may indicate that the write operation is complete once both writes to 422*a* and 412*a* are completed (e.g., once the write data to the device 422*a* has at least been written to cache of system 402 to later be written to a physical drive, and once the system 404 has completed the same with respect to device 412*a* and also sent a message to system 402 indicating such completion).

It should be noted that the above-mentioned migration in accordance with techniques herein may also be characterized in one aspect as a connectionless migration with respect to the target or secondary device 412*a*. Furthermore, the above-mentioned migration in accordance with techniques herein may also be characterized as a cloud migration when the network 406 is the internet.

The systems and processes discussed herein may be implemented on a computer-readable medium, such as a computer memory and/or portable hardware memory medium, on which is stored executable code that, when executed by at least one processor, performs one or more of the operations and/or processes discussed herein. Computer-readable media may include different forms of volatile (e.g., RAM) and non-volatile (e.g., ROM, flash memory, magnetic or optical disks, or tape) storage which may be removable or non-removable.

Other embodiments of the invention will be apparent to those skilled in the art from a consideration of the specification or practice of the invention disclosed herein. It is intended to that the specification and examples be considered as exemplary only, with the true scope and spirit of the invention being indicated by the following claims.

What is claimed is:

1. A system comprising:
a first computer system including a first operating system and first hardware native to said first computer system, wherein the first computer system accesses storage devices in accordance with a first format that is native to the first computer system;
a second computer system including a simulated computing environment and a second operating system different from the first operating system, the simulated computing environment including a simulated operating system that simulates at least a portion of said first operating system and the simulated computing environment including second simulation software simulating at least a portion of the first hardware;

a data storage system connected to the second computer system over a first connection thereby providing the second computer system access to a first storage device of the data storage system, said first storage device being accessible to the second computer system over the first connection operating in accordance with a first protocol native to the first computer system and not the second computer system, the second simulation software providing emulation capabilities in accordance with the first protocol native to the first computer system and not the second computer system, wherein the data storage system includes the first storage device having data stored in accordance with the first format and a second storage device having data stored in accordance with a second format that is native to the second computer system, said first format being non-native to the second computer system, said second computer system issuing I/O operations to both the first storage device and the second storage device whereby the second computer system accesses the first storage device using the simulated computing environment; and a network connection between the first computer system and the second computer system, wherein the first computer system is provided access to the first storage device by issuing I/O operations to the first storage device indirectly through the second computer system whereby the second computer system receives the I/O operations from the first computer system and then the second computer system uses the simulated computing environment to issue the I/O operations to the first storage device.

2. The system of claim 1, wherein said simulated computing environment includes a simulated z/OS.

3. The system of claim 1, wherein said simulated computing environment includes a simulated System z hardware platform.

4. The system of claim 3, wherein said simulated computing environment includes a simulated I/O subsystem.

5. The system of claim 1, wherein said simulated computing environment includes a channel emulator.

6. The system of claim 5, wherein the channel emulator acts as an I/O subsystem providing FICON communication capability to the first storage device over the first connection.

7. The system of claim 6, wherein the first computer system further comprises first code stored on a computer readable medium for:
intercepting an I/O operation having the first format directed to the first storage device;
encapsulating the I/O operation in a message in accordance with a network protocol; and
communicating the message over the network connection from the first computer system to the second computer system.

8. The system of claim 7, wherein the second computer system further comprises second code stored on a computer readable medium for:
receiving the message;
transforming data of the message to the I/O operation having the first format; and
issuing the I/O operation to the first storage device over the first connection using the channel emulator.

9. The system of claim 8, wherein the first storage device has data stored in accordance with count key data format whereby data records of the first storage device vary in length.

10. The system of claim 9, wherein the first connection has a source port operating in accordance with a fiber channel protocol for accessing storage devices in accordance with a fixed block architecture.

11. The system of claim 9, wherein the I/O operation to the first storage device is performed by executing a channel word program.

12. A method for providing access to storage devices comprising:
sending, over a network connection from a first computer system to a second computer system, a first I/O request directed to a first storage device of a data storage system, the first computer system including a first operating system and first hardware native to said first computer system, the second computer system including a simulated computing environment and a second operating system different from the first operating system, the simulated computing environment including a simulated operating system that simulates at least a portion of said first operating system and the simulated computing environment including second simulation software simulating at least a portion of the first hardware wherein the first computer system accesses storage devices in accordance with a first format that is native to the first computer system, wherein the data storage system includes the first storage device having data stored in accordance with the first format and a second storage device having data stored in accordance with a second format that is native to the second computer system, said first format being non-native to the second computer system, said second computer system issuing I/O operations to both the first storage device and the second storage device whereby the second computer system accesses the first storage device using the simulated coming environment; and receiving the first I/O request at the second computer system, wherein the data storage system is connected to the second computer system over a first connection thereby providing the second computer system access to the first storage device of the data storage system, said first storage device being accessible to the second computer system over the first connection operating in accordance with a first protocol, wherein the second simulation software provides emulation capabilities in accordance with the first protocol thereby allowing the second computer system to issue the first I/O request to the first storage device on behalf of the first computer system, said second computer system using the simulated computing environment to issue the first I/O request to the first storage device.

13. The method of claim 12, wherein said simulated computing environment includes a simulated z/OS.

14. The method of claim 12, wherein said simulated computing environment includes a simulated System z hardware platform and a simulated I/O subsystem.

15. The method of claim 14, wherein said simulated computing environment includes a channel emulator acting as an I/O subsystem providing FICON communication capability to the first storage device over the first connection.

16. The method of claim 15, further comprising:
intercepting, on the first computer system, the first I/O request having the first format directed to the first storage device;
encapsulating the first I/O request in a message in accordance with a network protocol;

communicating the message over the network connection from the first computer system to the second computer system;

receiving the message at the second computer system;

transforming data of the message at the second computer system to the first I/O request having the first format; and issuing, on the second computer system, the first I/O request to the first storage device over the first connection using the channel emulator.

17. The method of claim 16, wherein the first storage device has data stored in accordance with count key data format whereby data records of the first storage device vary in length, the first connection has a source port operating in accordance with a fiber channel protocol for accessing storage devices in accordance with a fixed block architecture, and the first I/O request directed to the first storage device is performed by executing a channel word program.

18. The method of claim 12, wherein the first storage device on the second computer system is a mirror of a primary device on the first computer system whereby write operations to the primary device are automatically mirrored to the first storage device.

19. The method of claim 12, wherein the first storage device on the second computer system is a target device of a data migration whereby a source device on the first computer system is having its data migrated to the target device and the first I/O request is one of a plurality of write operations to copy data from the source device to the target device.

20. A computer readable medium comprising code stored thereon for providing access to storage devices, the computer readable medium comprising code, which when executed by a processor, performs a method comprising:

sending, over a network connection from a first computer system to a second computer system, a first I/O request directed to a first storage device of a data storage system, the first computer system including a first operating system and first hardware native to said first computer system, the second computer system including a simulated computing environment and a second operating system different from the first operating system, the simulated computing environment including a simulated operating system that simulates at least a portion of said first operating system and the simulated computing environment including second simulation software simulating at least a portion of the first hardware, wherein the first computer system accesses storage devices in accordance with a first format that is native to the first computer system, wherein the data storage system includes the first storage device having data stored in accordance with the first format and a second storage device having data stored in accordance with a second format that is native to the second computer system, said first format being non-native to the second computer system, said second computer system issuing I/O operations to both the first storage device and the second storage device whereby the second computer system accesses the first storage device using the simulated computing environment; and receiving the first I/O request at the second computer system, wherein the data storage system is connected to the second computer system over a first connection thereby providing the second computer system access to the first storage device of the data storage system, said first storage device being accessible to the second computer system over the first connection operating in accordance with a first protocol, wherein the second simulation software provides emulation capabilities in accordance with the first protocol thereby allowing the second computer system to issue the first I/O request to the first storage device on behalf of the first computer system, said second computer system using the simulated computing environment to issue the first I/O request to the first story device.

* * * * *